June 9, 1959

H. H. VAN ABBE 2,890,403

TRANSISTOR PULSE GENERATOR

Filed Jan. 26, 1956

INVENTOR
HENRI HERMAN VAN ABBE
BY [signature]
AGENT 2,890,403

TRANSISTOR PULSE GENERATOR

Henri Herman van Abbe, Eindhoven, Netherlands, assignor, by mesne assignments, to North American Philips Company, Inc., New York, N.Y., a corporation of Delaware Application January 26, 1956, Serial No. 561,625

Claims priority, application Netherlands February 28, 1955

8 Claims. (Cl. 321—2)

The present invention relates to a transistor pulse generator circuit arrangement. More particularly, the invention relates to a circuit arrangement including a transistor, which is caused to produce pulses by aperiodic transformer feed-back, wherein the voltage produced across a transformer winding is fed back through a resistor to the base electrode of the transistor. Such an arrangement may, for example, be used, subsequent to rectification of the pulses produced, for converting with high efficiency a comparatively low direct supply voltage for the transistor into a considerably higher voltage supplied to a load.

It is found that at higher values of the pulse repetition frequency the arrangement exhibits more losses due to space-charge currents in the base zone of the transistor. These losses could be reduced by using a transistor having a higher limit frequency, more particularly, of the n-p-i-n or the p-n-i-p type. As an alternative, the transistor could be driven in grounded base connection instead of in grounded emitter connection, but in such case an emitter resistor would be required to limit the maximum current passing the transistor, so that additional losses would occur.

The principal object of the present invention is the provision of a pulse generator circuit utilizing a transistor.

An object of the present invention is the provision of a pulse generator circuit utilizing a transistor which is highly efficient in operation.

A further object of the present invention is the provision of a pulse generator circuit utilizing a transistor which has greatly reduced collector current losses.

In accordance with the present invention, in order to reduce the losses, the pulses produced are supplied to a point between the resistor and the base electrode through an impedance which passes at least the leading edges of said pulses, but which has a substantially high value at the pulse repetition frequency.

Figure 1:
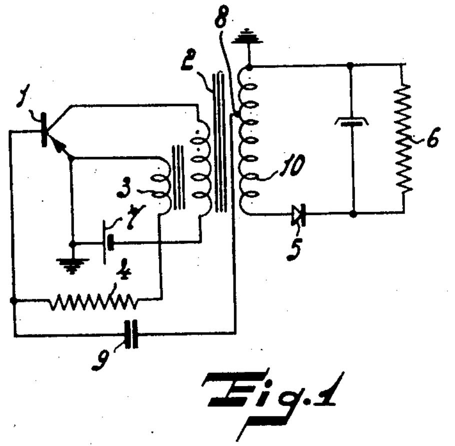
Figure 2:
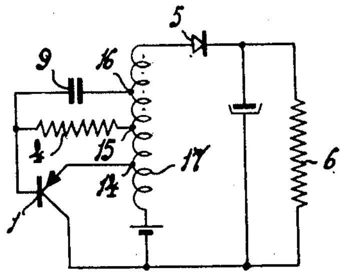

The invention will be described in greater detail with reference to the accompanying drawing, wherein:

Fig. 1 is a schematic diagram of one embodiment of the circuit arrangement of the present invention; and Fig. 2 is a modification of the embodiment of Fig. 1.

The circuit arrangement shown in Fig. 1 comprises a transistor 1, of the p-n-p type, which is caused to produce pulses by aperiodic feed-back with the aid of a transformer 2. The voltage produced across a winding 3 of the transformer 2 is fed back through a current limiting resistor 4, determining the pulse amplitude, to the base electrode of the transistor 1. Thus, a sawtooth collector current traverses the transistor 1 and produces a relatively high voltage pulse across the transformer 2 at the fly-back of the sawtooth. This voltage pulse is supplied, for example via a rectifier 5, to a load 6. Thus, a materially higher supply voltage than the voltage of the supply source for the transistor 7 is available at the load.

If such an arrangement is used for higher frequencies and if the transistors are designed for higher power, the maximum collector current being for example 100 milliamperes, material losses occur which reduce the efficiency of the voltage conversion. According to the recognition underlying the invention, these losses must be due to the fact that the "hole" space charge accumulated during the fly-back of the sawtooth current in the base zone tends to flow away for the major part to the collector electrode. This means on the one hand, that an additional charge current of the pulses is produced which flows at the expense of the current available for the load 6. On the other hand, this represents a higher dissipation in the transistor, so that the maximum power of the arrangement decreases.

In accordance with the invention, the charge current or loss current is materially reduced when the voltage produced at the tapping point 8 of the transformer winding 10 is supplied through a capacitor 9 to the base electrode. Thus, a high blocking voltage is operative at the base electrode, this voltage driving the said "hole" space charge for a material part back to the emitter electrode of the transistor, so that the loss current to the collector electrode is reduced. To acomplish this, the winding 3 could comprise more turns, but in this case the resistor 4 would have to have a higher value, in order to control the transistor to the same base current during the fly-back of the sawtooth, and there would be no improvement. As an alternative, a rectifier with a pass direction corresponding to the base blocking pulses could be connected in parallel with the resistor 4, but with the high currents referred to above there is a practical objection that rectifiers having a pass resistance which is materially lower than the resistor 4 are obtainable only with difficulty.

A material improvement is obtained, if the resistor 4 is shunted by a capacitor. The shunting capacitor must be so small, that charging phenomena due to the base current of the transistor are avoided, i.e. it must allow the leading edges of the pulses produced to pass, but it must constitute a substantially high impedance at the pulse repetition frequency. The same applies to the capacitor 9 of Fig. 1, in which case a further reduction of the said loss current is obtained by means of the higher voltage pulse at the tapping point 8. This voltage pulse must, however, not be too high, since otherwise too much pulse energy is dissipated in the resistor 4.

In a practical embodiment, the collector winding of the transformer 2 had 84 turns, the base winding 3 of said transformer had 12 turns, the tertiary winding 10 of the said transformer had in total 250 turns and up to the tapping point 8 it had 24 turns, the resistor 4 had a resistance of 80 ohms, the capacitor 9 had a capacitance of 56,000 micromicrofarads. The transistor 1, having a limit frequency of 15 kilocycles per second, in grounded emitter connection, was controlled to a maximum collector current of 75 milliamperes. In the collector without the capacitor 9, a power of 15 milliwatts was dissipated; when the capacitor 9 was connected in parallel with the resistor 4, a power of 10 milliwatts was dissipated; when the capacitor 9, as shown in Fig. 1, was connected to the tapping point 8, a power of only 7 milliwatts was dissipated. The power dissipated in the transistor according to the static characteristic curve was 4.5 milliwatts. The pulse repetition frequency was 5 kilocycles per second and the pulse width was 30 microseconds. Apart from this reduction of the losses in the collector, there is a materially shorter duration of the collector loss current, which reduces the possibility of instantaneous overload of the transistor during the production of the pulses.

Fig. 2 is a modification of the embodiment of Fig. 1, in which the emitter electrode of the transistor 1 is connected to a tapping point 14 of an autotransformer 17, The base electrode of the transistor 1 is connected through the resistor 4 to a tapping point 15 of the autotransformer 17, and through the capacitor 9 to a tapping point 16 of said autotransformer. The voltage of the autotransformer is supplied through the rectifier 5 to the load 6. The operation of the circuit arrangement of Fig. 2 is similar to that of Fig. 1.

What is claimed is:

1. A pulse generating circuit arrangement comprising a transistor having emitter, collector and base electrodes, transformer means interconnecting said electrodes in feedback relationship, a resistor element arranged in feedback relationship in the connection between said base electrode and said transformer means, part of the voltage produced in said transformer means being fed back to said base electrode through said resistor element, and means for supplying pulses from said transformer means to a point between said base electrode and said resistor element, said pulse supplying means comprising an impedance member having a relatively low impedance to the leading edges of said pulses and having a relatively high impedance at the repetition frequency of the said pulses.

2. A pulse generating circuit arrangement comprising a transistor having emitter, collector and base electrodes, transformer means interconnecting said electrodes in feedback relationship, said transformer means comprising a plurality of winding portions, means coupling a first of said winding portions to said collector electrode, a second of said winding portions being coupled between said emitter and base electrodes, a resistor element interposed between said second winding portion and said base electrode, and means for supplying pulses from said transformer means to a point between said base electrode and said resistor element, said pulse supplying means including a third of said winding portions and comprising an impedance member having a relatively low impedance to the leading edges of said pulses and having a relatively high impedance at the repetition frequency of the said pulses.

3. A circuit arrangement as claimed in claim 2, wherein said impedance comprises a capacitive reactance.

4. A pulse generating circuit arrangement comprising a transistor having emitter, collector and base electrodes, transformer means interconnecting said collector with said emitter and base electrodes in feedback relationship, said transformer means comprising a plurality of winding portions, means coupling a first of said winding portions to said collector electrode, a second of said winding portions being coupled between said emitter and base electrodes, a resistor element interposed between said second winding portion and said base electrode, a rectifier and a capacitor connected in series circuit arrangement with a third of said winding portions, a load coupled across said capacitor, and means for supplying pulses from said transformer means to a point between said resistor element and said base electrode, said pulse supplying means including a portion of said third winding portion and comprising an impedance member having a relatively low impedance to the leading edges of said pulses and having a relatively high impedance at the repetition frequency of the said pulses.

5. A circuit arrangement as claimed in claim 4, wherein said relatively high impedance is substantially higher than that of said resistor.

6. A circuit arrangement comprising a transistor having emitter, collector and base electrodes, a source of supply voltage of given value, an inductive winding connected in series with said source and said collector electrode, said winding having a plurality of tapping points thereon, means for connecting said emitter electrode to one of said tapping points, a resistor connected between said base electrode and a second of said tapping points, means for deriving voltage pulses from said winding having a value substantially greater than the value of the voltage of said source, a rectifier and a first capacitor connected in series circuit arrangement with said winding, a load coupled across said first capacitor, and a second capacitor coupled between a third of said tapping points and a point between said resistor and said base electrode, said second capacitor having a relatively low impedance to the leading edges of said pulses and having a relatively high impedance at the repetition frequency of the said pulses.

7. A pulse generating circuit arrangement comprising a transistor having emitter, collector and base electrodes, transformer means interconnecting said electrodes in feedback relationship, a resistor element connected in series circuit arrangement with a portion of said transformer means between said emitter and base electrodes, and means for supplying pulses from said transformer means to a point between said base electrode and said series circuit arrangement, said pulse supplying means comprising an impedance member having a relatively low impedance to the leading edges of said pulses and having a relatively high impedance at the repetition frequency of the said pulses.

8. A circuit arrangement comprising a transistor having emitter, collector and base electrodes, a source of supply voltage of given value, a first inductive winding connected in series with said source and said collector electrode, a resistor, a second inductive winding connected in series circuit arrangement with said resistor between said emitter and base electrodes, said windings being inductively coupled in feedback relationship thereby producing an oscillator system, a third inductive winding inductively coupled to said first inductive winding for deriving voltage pulses from said oscillator system having a value substantially greater than the value of the voltage of said source, a rectifier and a capacitor connected in series circuit arrangement with said third winding, a load coupled across said capacitor, and means for coupling a point on said third winding to a point between said base electrode and said first-mentioned series circuit arrangement, said coupling means comprising a capacitive reactance having a relatively low impedance to the leading edges of said pulses and having a relatively high impedance to the repetition frequency of the said pulses.

References Cited in the file of this patent

UNITED STATES PATENTS 2,780,767 Janssen ---------------- Feb. 5, 1957

OTHER REFERENCES

Article: Transistor Power Supply for Geiger Counters, pages 144–145 of Electronics for August 1954.

Article: Transistor Pulse Generators by Eckess et al.; pages 132–33 of Electronics for November 1955.

Article: Junction Transistor Circuit Applications, by Sulzer, pages 170–173 of Electronics for August 1953.

Notice of Adverse Decision in Interference

In Interference No. 92,149 involving Patent No. 2,890,403, H. H. Van Abbe, TRANSISTOR PULSE GENERATOR, final judgment adverse to the patentee was rendered Mar. 11, 1965, as to claims 1 and 7.

[*Official Gazette July 20, 1965.*]